US008588123B2

(12) United States Patent
Yi et al.

(10) Patent No.: US 8,588,123 B2
(45) Date of Patent: Nov. 19, 2013

(54) APPARATUS AND METHOD FOR MBMS IN WIRELESS COMMUNICATION SYSTEM

(75) Inventors: Seung June Yi, Seoul (KR); Sung Jun Park, Seoul (KR); Young Dae Lee, Seoul (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 522 days.

(21) Appl. No.: 12/853,954

(22) Filed: Aug. 10, 2010

(65) Prior Publication Data

US 2011/0038296 A1    Feb. 17, 2011

Related U.S. Application Data

(60) Provisional application No. 61/233,121, filed on Aug. 11, 2009.

(30) Foreign Application Priority Data

Aug. 9, 2010   (KR) .................... 10-2010-0076578

(51) Int. Cl.
  *H04W 4/06*   (2009.01)
  *H04W 8/26*   (2009.01)

(52) U.S. Cl.
  USPC .......... 370/312; 370/310; 370/311; 370/328; 370/329; 370/345; 370/346; 370/347; 370/348; 370/349; 370/350

(58) Field of Classification Search
  None
  See application file for complete search history.

(56) References Cited

U.S. PATENT DOCUMENTS

| 2005/0157876 | A1* | 7/2005 | Jeong et al. ................... 380/200 |
| 2008/0045224 | A1* | 2/2008 | Lu et al. ........................ 455/446 |
| 2009/0073909 | A1* | 3/2009 | Cai et al. ....................... 370/312 |
| 2009/0125776 | A1* | 5/2009 | Cheon et al. .................. 714/748 |
| 2010/0110945 | A1* | 5/2010 | Koskela et al. ............... 370/310 |
| 2010/0157919 | A1* | 6/2010 | Koskinen ...................... 370/329 |
| 2010/0290509 | A1* | 11/2010 | Dalsgaard et al. ............ 375/220 |
| 2010/0322133 | A1* | 12/2010 | Kuo ............................... 370/312 |
| 2011/0013576 | A1* | 1/2011 | Hsu ............................... 370/329 |
| 2011/0188436 | A1* | 8/2011 | Damnjanovic et al. ....... 370/312 |

FOREIGN PATENT DOCUMENTS

| KR | 1020050081511 | 8/2005 |
| KR | 1020050106845 | 11/2005 |
| KR | 1020050119582 | 12/2005 |

OTHER PUBLICATIONS

3rd Generation Partnership Project (3GPP), "Technical Specification Group Radio Access Network; Introduction of the Multimedia Broadcast Multicast Service (MBMS) in the Radio Access Network (RAN); Stage 2 (Release 7)," 3GPP TS 25.346, v7.0.0, pp. 23-47, Mar. 2006.

* cited by examiner

Primary Examiner — Hassan Phillips
Assistant Examiner — Gautam Sharma
(74) Attorney, Agent, or Firm — Lee, Hong, Degerman, Kang & Waimey (57) ABSTRACT

A method and apparatus of allocating a resource for a plurality of logical channels is provided. A transmitter acquires a plurality of available resources for a plurality of component carriers, and allocates the plurality of available resources to the plurality of logical channels based on priority of each of the plurality of logical channels.

10 Claims, 11 Drawing Sheets

(A) R/R/E/LCID/F/L sub-header with 7-bit L field (B) R/R/E/LCID/F/L sub-header with 15-bit L field (C) R/R/E/LCID sub-header

APPARATUS AND METHOD FOR MBMS IN WIRELESS COMMUNICATION SYSTEM

CROSS-REFERENCE TO RELATED APPLICATIONS

This application claims the benefit of U.S. Provisional Application Ser. No. 61/233,121 filed on Aug. 11, 2009, and also claims the benefit of earlier filing date and right of priority to Korean Patent Application No. 10-2010-0076578 filed on Aug. 9, 2010, the contents of all of which are incorporated by reference in their entirety herein.

BACKGROUND OF THE INVENTION

1. Field of the Invention

The present invention relates to wireless communications, and more particularly, to a method and apparatus for Multimedia Broadcast/Multicast Service (MBMS) in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A multimedia broadcast/multicast service (MBMS) is a service which provides multimedia traffic to a user equipment (UE) in a cell. In the 3GPP LTE, the MBMS is provided through a multicast channel (MCH) which is a common transport channel in order to increase efficiency of a radio resource, and a plurality of MCHs can be used in one cell according to capacity of a multicast traffic channel (MTCH) and a multicast control channel (MCCH). The MCH serves to transmit two types of logical channels, i.e., the MTCH and the MCCH, and is mapped to a physical multicast channel (PMCH) which is a physical channel.

Only one MCCH exists in each cell, and the MCCH is a control channel used for transmission of MBMS control information. In order for the UE to receive traffic data of a certain MBMS, the MCCH for transmitting the control information of the MBMS has to be received. This is because scheduling information regarding the MTCH for the MBMS is transmitted on the MCCH. The UE first receives the MCCH to acquire information regarding an MTCH for transmitting the MBMS desired by the UE and then receives the MTCH.

As a plurality of MBMSs is simultaneously provided, the UE can receive the MBMS on an MCH in which only MTCHs are multiplexed. How to receive an updated MCCH by the UE on the MCH in which only MTCHs are multiplexed is not introduced yet.

SUMMARY OF THE INVENTION

The present invention provides a method and apparatus for MBMS which enables to receive updated MBMS control information.

In an aspect, a method for a multimedia broadcast/multicast service (MBMS) includes receiving MBMS control information on a first multicast channel (MCH), receiving at least one MBMS traffic on a second MCH based on the MBMS control information, receiving a medium access control (MAC) protocol data unit (PDU) indicating a change of the MBMS control information on the second MCH, and receiving updated MBMS control information on first MCH if the change of the MBMS control information is indicated.

The MBMS control information may not be included in the MAC PDU.

The MAC PDU may include a MAC control element (CE) indicating the change of the MBMS control information.

The MAC PDU may include a MAC subheader corresponding to the MAC CE, and the MAC subheader may include a logical channel ID (LCID) for identifying the MAC CE.

If the MAC CE is included in the MAC PDU, the change of the MBMS control information may be indicated.

The MBMS control information may include a first value tag, and the MAC CE may include a second value tag. If the first value tag and the second value tag are different from each other, the change of the MBMS control information may be indicated.

In another aspect, a wireless apparatus for a multimedia broadcast/multicast service (MBMS) includes a radio frequency unit for transmitting and receiving a radio signal, and a processor operatively coupled with the radio frequency unit and configured to receive MBMS control information on a first multicast channel (MCH), receive at least one MBMS traffic on a second MCH based on the MBMS control information, receive a medium access control (MAC) protocol data unit (PDU) indicating a change of the MBMS control information on the second MCH, and receive updated MBMS control information on first MCH if the change of the MBMS control information is indicated.

Unnecessary channel switching to receive a MCCH can be minimized during MBMS. Delay of MBMS and battery consumption of the user equipment can be minimized.

DESCRIPTION OF EXEMPLARY EMBODIMENTS

Figure 1:
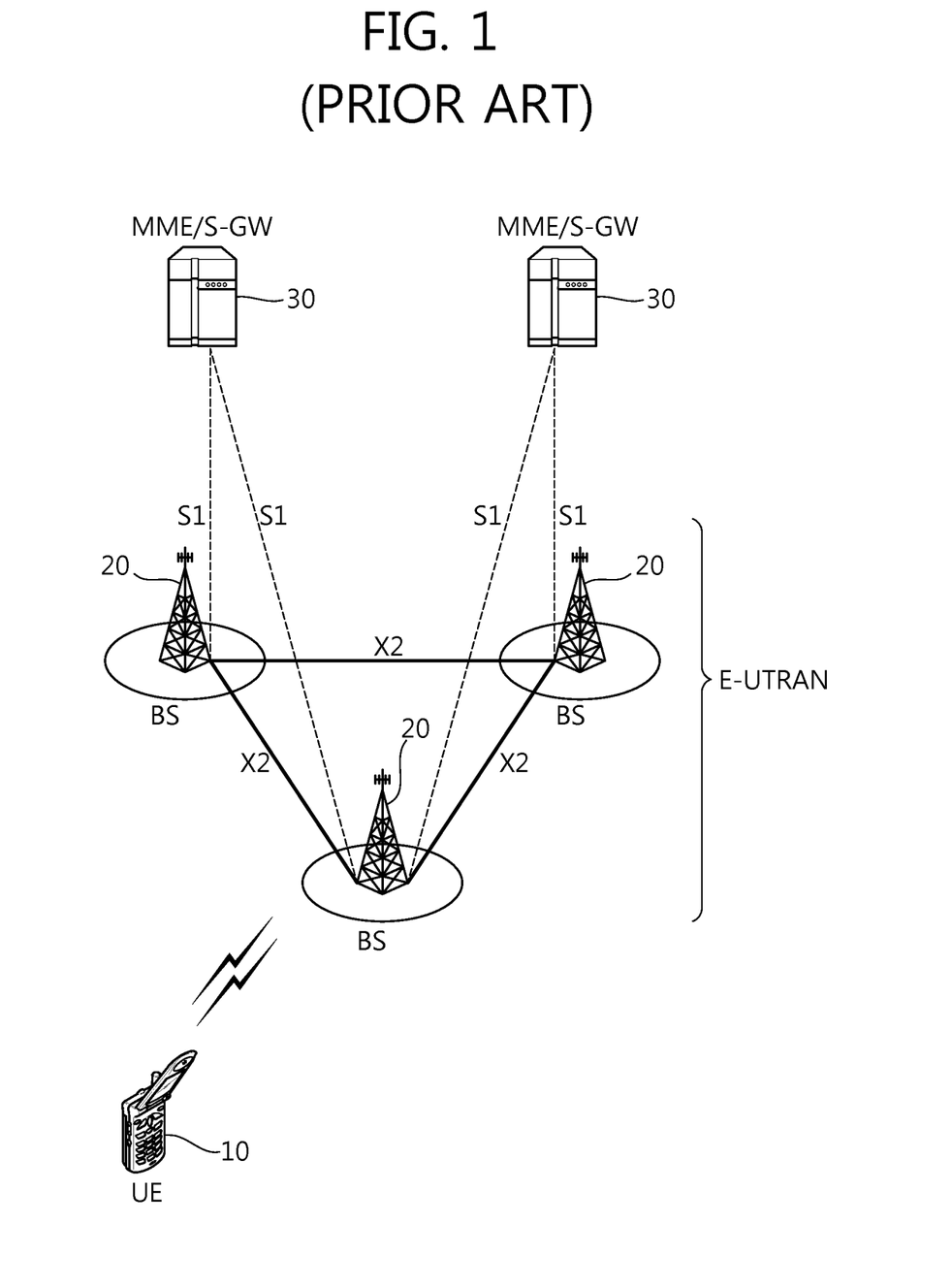
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges a RRC message between the UE and the BS.

Figure 2:
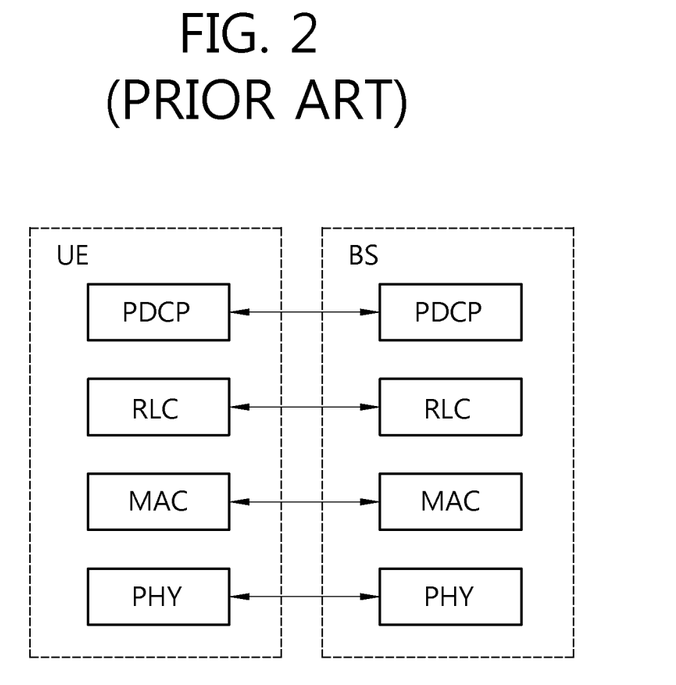
FIG. 2 is a diagram showing a radio protocol architecture for a user plane.
Figure 3:
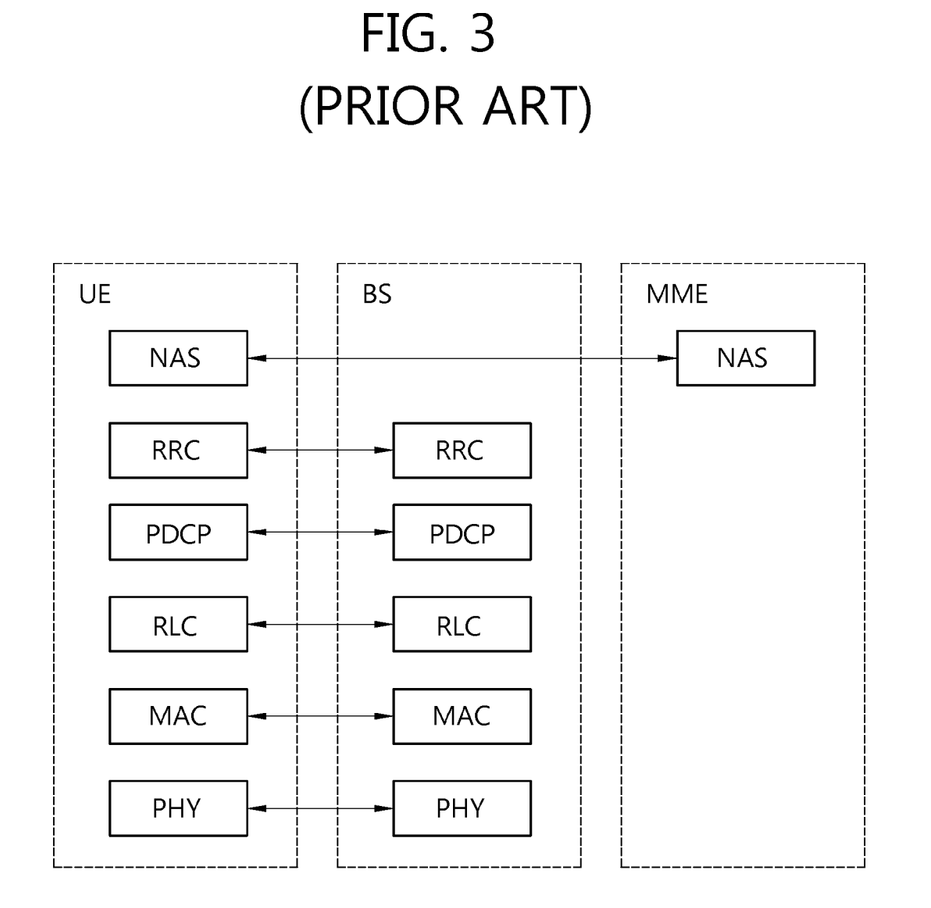
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting a RRC message in the control plane. The DRB is used as a path for transmitting user data in the user plane.

When a RRC connection exists between a RRC layer of the UE and a RRC layer of the network, the UE is in a RRC connected state, and otherwise the UE is in a RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

A multimedia broadcast/multicast service (MBMS) is a service which provides multimedia data to a UE in a cell. In the 3GPP LTE, the MBMS is transmitted through an MCH which is a common transport channel in order to increase efficiency of a radio resource, and a plurality of MCHs can be used in one cell according to capacity of an MTCH and an MCCH. The MCH serves to transmit two types of logical channels, i.e., the MTCH and the MCCH, and is mapped to a physical multicast channel (PMCH) which is a physical channel.

Figure 4:
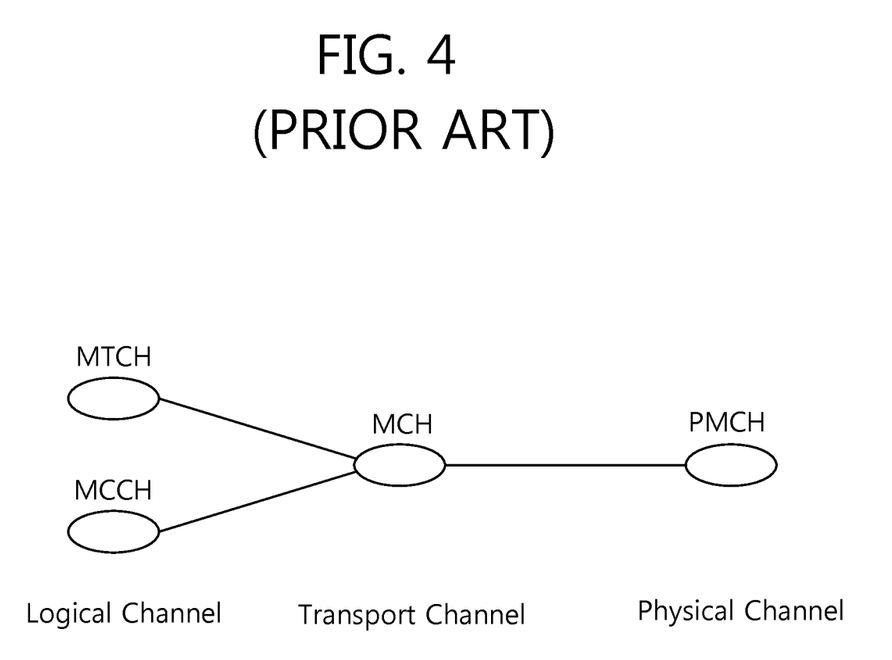
FIG. 4 shows channel mapping for an MBMS.

FIG. 4 shows channel mapping for an MBMS.

A PMCH which is a physical channel carries an MCH. The MCH which is a transport channel is broadcast in a cell.

An MTCH which is a logical channel is a traffic channel for transmitting traffic data of the MBMS. One MBMS service is transmitted through one MTCH, and thus a plurality of MTCHs may exist in one cell.

Only one MCCH exists in each cell, and the MCCH which is a logical channel is a control channel used for transmission of MBMS control information. In order for a UE to receive data of a certain MBMS, the MCCH for transmitting the control information of the MBMS has to be received. This is because scheduling information regarding the MTCH for the MBMS is transmitted on the MCCH. The UE first receives the MCCH to acquire information regarding an MTCH for transmitting the MBMS desired by the UE and then receives the MTCH.

MBMS control information on the MCCH may include at least one of an identity of the MBMS, an identify of a session of the MBMS, and scheduling information of a (P)MCH (i.e., resource allocation information for receiving the (P)MCH).

Figure 5:
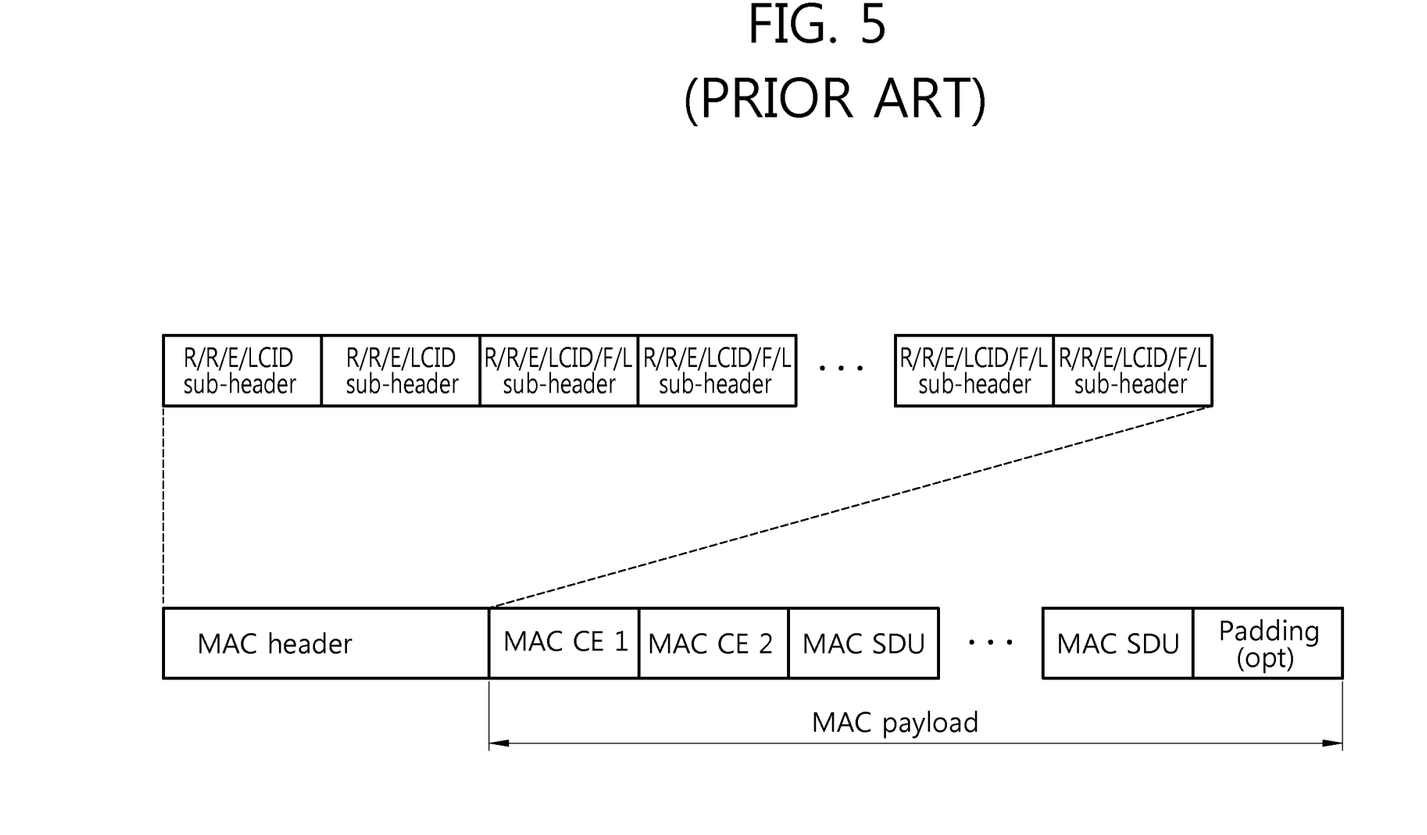
FIG. 5 shows a structure of a MAC PDU in 3GPP LTE.

FIG. 5 shows a structure of a MAC PDU in 3GPP LTE.

The MAC protocol data unit (PDU) includes a MAC header, a MAC control element (CE), and at least one MAC service data unit (SDU). The MAC header includes at least one subheader, and each subheader corresponds to the MAC CE and the MAC SDU. The subheader represents a length and property of the MAC CE and the MAC SDU. The MAC SDU is a data block provided from a higher layer of a MAC layer (e.g., an RLC layer or an RRC layer). The MAC CE is used to deliver control information of the MAC layer similarly to a buffer status report.

Figure 6:
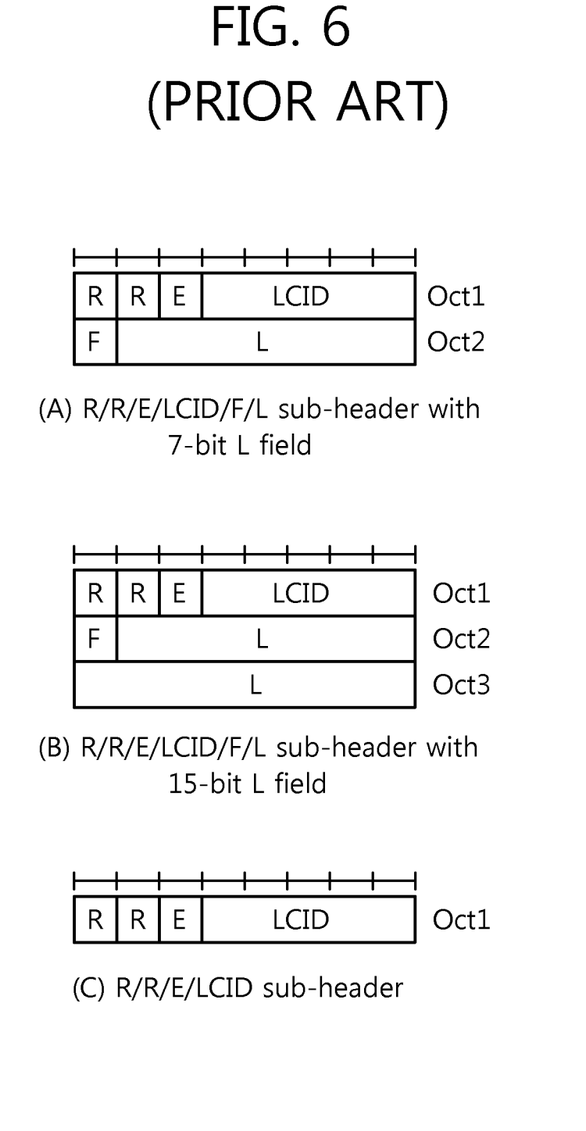
FIG. 6 shows various examples of a MAC subheader.

FIG. 6 shows various examples of a MAC subheader.

The MAC subheader may include the following fields.

R (1 bit): a reserved field

E (1 bit): an extension field. It indicates whether a following field is F and L fields.

LCID (5 bit): a logical channel ID field. It indicates which type of an MAC CE is used or to which logical channel a MAC SDU belongs.

F (1 bit): a format field. It indicates whether a following L field is 7 bits or 15 bits.

L (7 or 15 bit): a length field. It indicates a length of the MAC CE or the MAC SDU corresponding to the MAC subheader.

The MAC subheader corresponding to a fixed-sized MAC CE does not include the F and L fields.

Subfigures (A) and (B) of FIG. 6 show examples of a MAC subheader corresponding to a variable-sized MAC CE and a MAC SDU. Subfigure (C) of FIG. 6 shows an example of a MAC subheader corresponding to a fixed-sized MAC CE.

A plurality of MTCHs can be multiplexed in one MCH. When the plurality of MBMSs is provided by a specific cell, a plurality of MCHs can be used. However, since only one MCCH exists for each cell according to current 3GPP LTE, the MCCH is transmitted only through one MCH among a plurality of MCHs.

Figure 7:
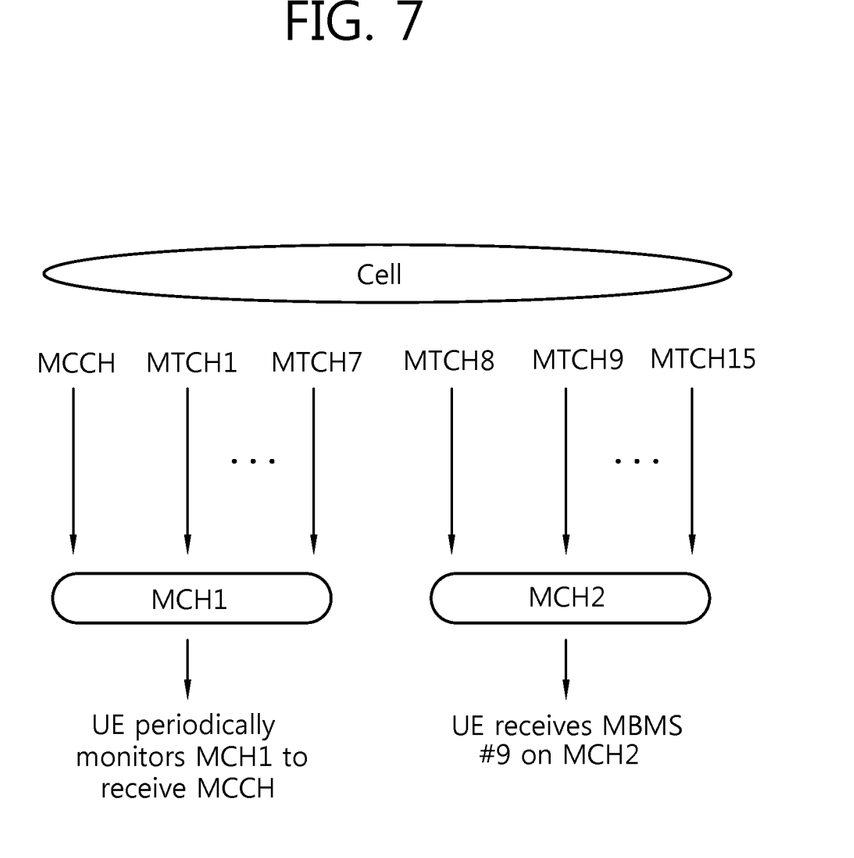
FIG. 7 shows a problem caused by the conventional method.

FIG. 7 shows a problem caused by the conventional method. 15 MBMS are provided to a certain cell, and each MBMS has its corresponding MTCH. Assume that an MCCH and MTCHs 1 to 7 are transmitted by being multiplexed in an MCH 1, and MTCHs 8 to 15 are transmitted by being multiplexed in an MCH 2.

If a UE intends to receive a $9^{th}$ MBMS, the UE has to receive an MTCH 9 transmitted through the MCH 2. If the UE receives only the MCH 2 to receive the MTCH 9, the MCCH transmitted on the MCH 1 cannot be received.

If the UE also has an interest on a different MBMS, the UE needs to periodically receive the MCCH to confirm whether the different MBMS is provided. However, since the MCCH is transmitted using an MCH different from the MTCH 9 which is currently received, there is a problem in that the UE has to stop receiving the MCH 2 to receive the MCCH and has to monitor the MCH 1.

Moreover, since the UE has to periodically monitor the MCCH, battery consumption of the UE occurs due to the monitoring.

Therefore, in order to prevent the UE from periodically receiving the MCCH unnecessarily, a method of adding an MCCH change indication to an MCH on which the MCCH is not transmitted is proposed.

Figure 8:
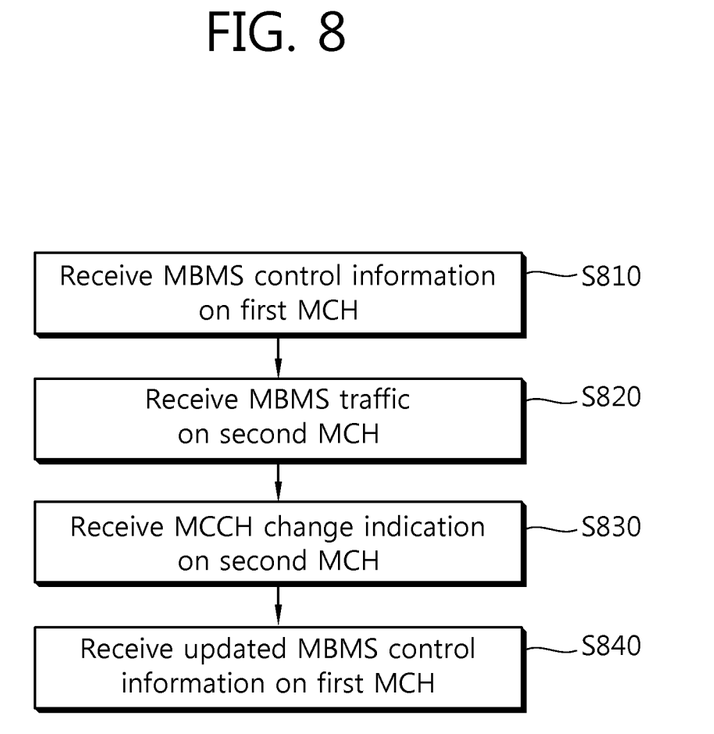
FIG. 8 is a flowchart showing an MBMS method according to an embodiment of the present invention.

FIG. 8 is a flowchart showing an MBMS method according to an embodiment of the present invention.

A UE receives MBMS control information on a first MCH (step S810). A MCCH for the MBMS control information is multiplexed in the first MCH.

The UE receives at least one MBMS traffic on a second MCH based on the MBMS control information (step S820). In the MCH, one or more MTCH for the at least one MBMS traffic may be multiplexed but an MCCH may not be multiplexed.

The UE receives an MAC PDU including an MCCH change indication on the second MCH (step S830). The MCCH change indication indicates a change of the MBMS control information. The MCCH change indication can be added as an MAC CE in an MAC PDU and can be transmitted on the second MCH.

The UE receives updated MBMS control information on the first MCH (step S840). Upon receiving the MCCH change indication while receiving the MTCH on the second MCH on which the MCCH is not transmitted, the UE switches a channel to the first MCH on which the MCCH is transmitted.

The MCCH change indication may be transmitted in various formats.

Figure 9:
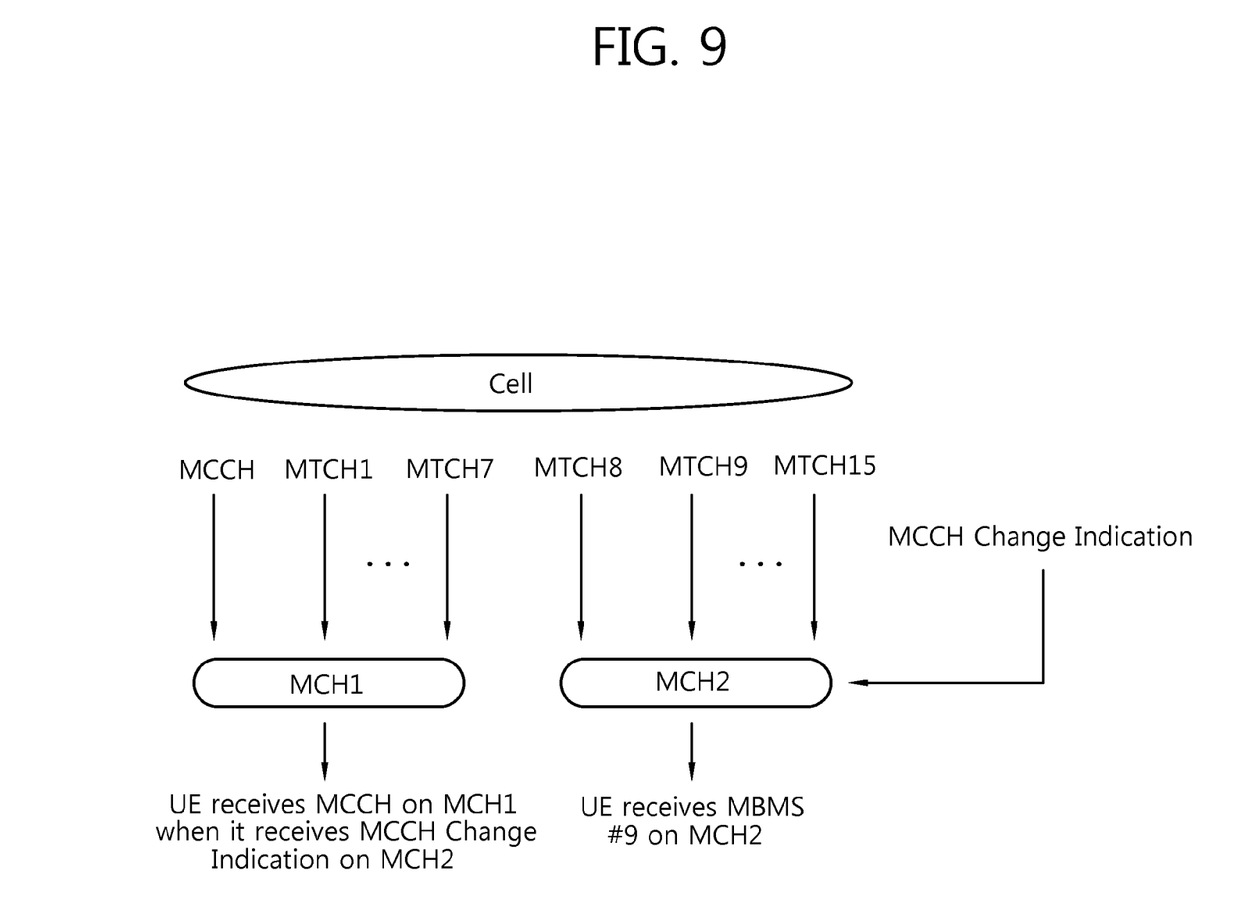
FIG. 9 shows an example of an MCCH change indication.

FIG. 9 shows an example of an MCCH change indication.

Only when the MBMS control information is changed, a BS can allow the MCCH change indication to be included in a MAC PDU on the MCH. Upon receiving the MCCH change indication while receiving the MTCH, a UE determines that the content of the MCCH is changed, and receives an updated MCCH by performing channel switching to the first MCH on which the MCCH is transmitted. If the MCCH change indication does not exist in the MAC PDU including the MTCH, the UE determines that the MCCH is not changed and continuously receives the second MCH.

The UE receives an MBMS #9 on an MCH 2 through an MTCH 9. If the MAC PDU including the MCCH change indication is received on the MCH 2, the UE receives the MCCH on the MCH 1.

Figure 10:
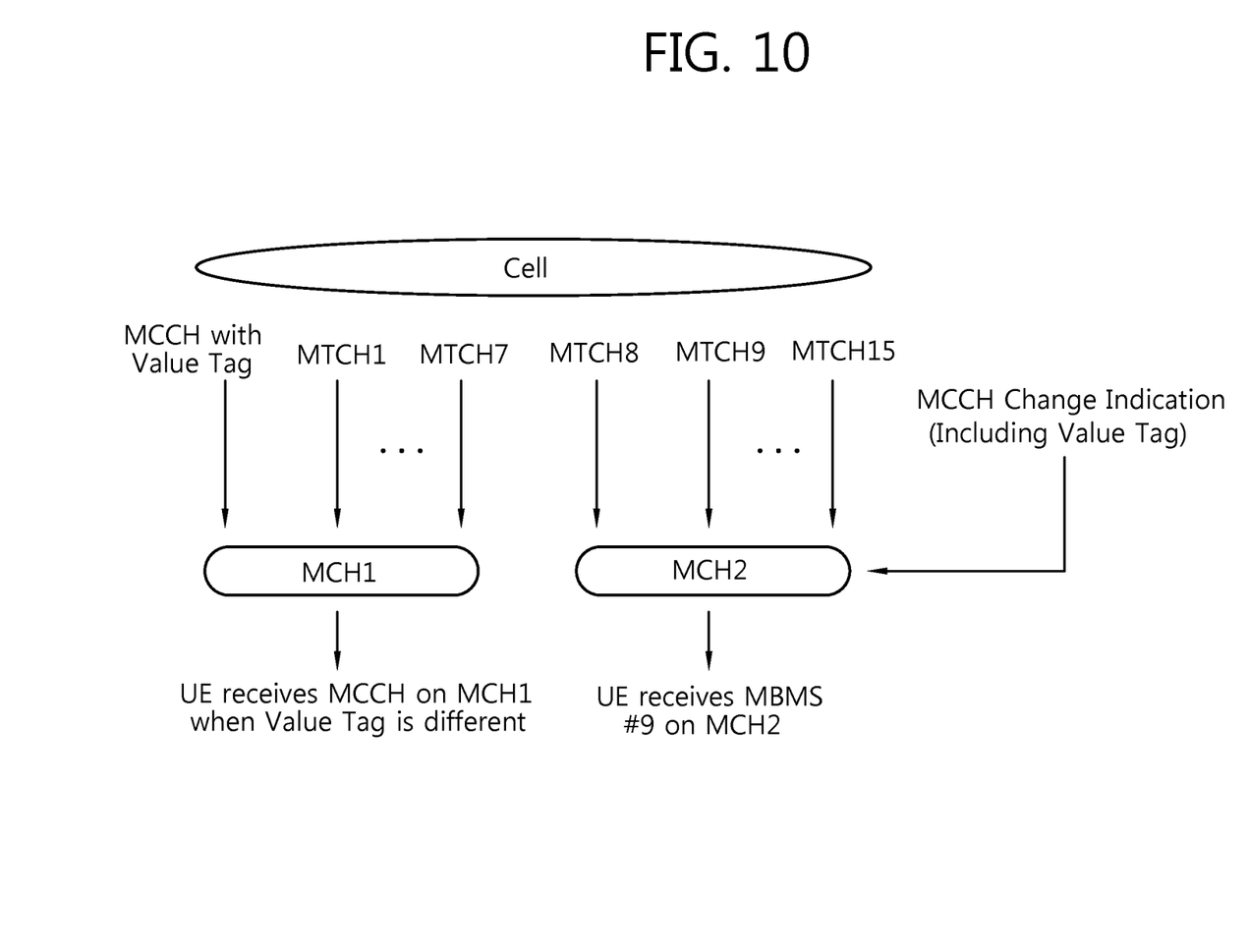
FIG. 10 shows another example of an MCCH change indication.

FIG. 10 shows another example of an MCCH change indication.

An MCCH is transmitted by adding a first value tag, and the MCCH change indication is transmitted by including a second value tag. The value tag indicates whether the MCCH is changed, and may be represented in various forms such as a version number of the MCCH, a sequence number, a counter, etc. For example, whenever the content of the MCCH is changed, a value of the value tag may be incremented by 1.

If the content of the MCCH is changed, a BS increments the second value tag of the MCCH change indication. A UE compares a value of the first value tag of a previous MCCH with a value of the second value tag of a current MCCH change indication, and if the two values are different from each other, receives the MCCH by regarding that the MCCH is changed. The MCCH is transmitted always by including the value of the value tag. Even in the MCH on which the MCCH is not transmitted, the MCCH change indication is always included in transmission.

In order for the UE to receive a certain MBMS service, the UE first receives the MCCH. The UE stores the first value tag of the received MCCH in a memory. Then, when the MTCH is received afterwards, the second value tag in the MCCH change indication is checked. If the second value tag and the first value tag are different from each other, the UE determines that the content of the MCCH is changed, and receives the changed MCCH by switching a channel to the MCH on which the MCCH is transmitted. Otherwise, if the second value tag and the first value tag are equal to each other, the UE determines that there is no change in the MCCH and continuously receives the MTCH.

Since the MCCH change indication is always transmitted on the MCH on which the MCCH is not multiplexed, advantageously, the UE can easily know whether the MCCH is changed even if there is a loss in the MCH.

Meanwhile, the MCCH change indication is included in a MAC PDU as a MAC CE. A specific identify can be used to configure a MAC subheader corresponding to the MAC CE for the MCCH change indication. A logical channel ID (LCID) may be defined to identify the MAC CE for the MCCH change indication.

The following table shows an example of the LCID for the MAC CE.

TABLE 1

| Index | LCID values |
| --- | --- |
| 00000 | CCCH |
| 00001-01010 | Identity of the logical channel |
| 01011-11010 | Reserved |
| 11011 | MCCH Change Indication |
| 11100 | UE contention Resolution Identity |
| 11101 | Timing Advance Command |
| 11110 | DRX Command |
| 11111 | Padding |

As a MAC SDU, MTCH traffic is multiplexed with the MCCH change indication in a MAC PDU. The MCCH change indication MAC CE may be multiplexed in the MAC PDU prior to the MTCH traffic. This is to allow the UE to receive this MAC CE before other MTCH traffic so as to more rapidly know changes in the MCCH.

The MCCH change indication may consist of only an MAC subheader. That is, if only an R/R/E/LCID MAC subheader representing 'LCID=MCCH change indication' is included in the MAC PDU, the UE knows that there is a change in the MCCH and thus receives the MCCH. In this case, a length of the MAC CE is regarded as 0.

If the MCCH change indicator includes a value tag, a MAC subheader representing 'LCID=MCCH change indication' and a MAC CE including a value tag can be included in the MAC PDU. If a size of the value tag is fixed, a fixed-sized MAC subheader can be used, and if the size of the value tag is variable, a variable-sized MAC subheader can be used.

Figure 11:
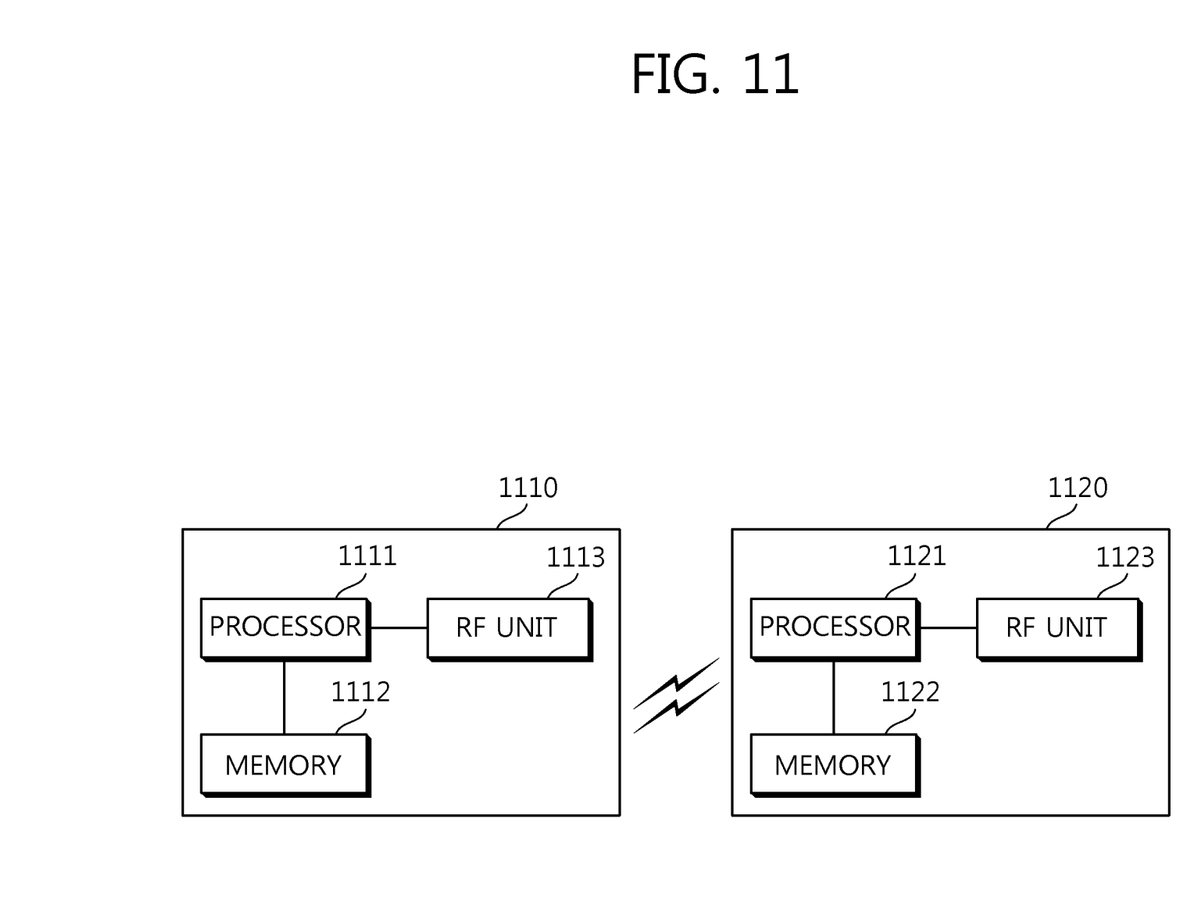
FIG. 11 is a block diagram showing a wireless communication system for implementing an embodiment of the present invention.

FIG. 11 is a block diagram showing a wireless communication system for implementing an embodiment of the present invention.

A BS 1110 includes a processor 1111, a memory 1112, and a radio frequency (RF) unit 1113.

The processor 111 implements the proposed functions, processes, and/or methods. The aforementioned operation of the BS may be implemented by the processor 1111. The processor 1111 may transmit MBMS control information and/or MBMS traffic on a MCH. The processor 1111 may construct a MAC PDU to indicate a change of the MBMS control information and may transmit the MAC PDU on the MCH.

The memory 1112 is coupled to the processor 1111, and stores a protocol or parameter for the operation. The RF unit 1113 is coupled to the processor 1111, and transmits and/or receives a radio signal.

A UE 1120 includes a processor 1121, a memory 1122, and an RF unit 1123.

The processor 1121 implements the proposed functions, processes, and/or methods. The aforementioned operation of the UE may be implemented by the processor 1121. The processor 1121 may receive the MBMS control information and/or the MBMS traffic on the MCH. The processor 1111 may receive the MAC PDU to indicate a change of the MBMS control information and may receive updated MBMS control information.

The memory 1122 is coupled to the processor 1121, and stores a protocol or parameter for the operation. The RF unit 1123 is coupled to the processor 21, and transmits and/or receives a radio signal.

The processors may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for receiving a multimedia broadcast/multicast service (MBMS) service in a wireless communication system, the method comprising:
   receiving MBMS control information on a first multicast channel (MCH);
   receiving at least one MBMS traffic on a second MCH based on the MBMS control information;
   receiving a medium access control (MAC) protocol data unit (PDU) on the second MCH,
   wherein the MAC PDU includes information indicating a change of the MBMS control information,
   wherein the information is a multicast control channel (MCCH) change indication,
   wherein the information is a MAC control element (CE) indicating the change of the MBMS control information, and
   wherein the MAC PDU further includes a MAC subheader corresponding to the MAC CE, and the MAC subheader includes a logical channel ID (LCID) for identifying the MAC CE; and receiving changed MBMS control information on the first MCH if the information indicates the change of the MBMS control information.

2. The method of claim 1, wherein the MBMS control information is not included in the MAC PDU.

3. The method of claim 1, wherein, if the MAC CE is included in the MAC PDU, it indicates that there is the change of the MBMS control information.

4. The method of claim 1, wherein the MBMS control information includes a first value tag, and the MAC CE includes a second value tag, and wherein if the first value tag and the second value tag are different from each other, it indicates that there is the change of the MBMS control information.

5. A wireless apparatus for receiving a multimedia broadcast/multicast service (MBMS) service, the wireless apparatus comprising:

a radio frequency unit for transmitting and receiving a radio signal; and a processor operatively coupled with the radio frequency unit and configured to:

receive MBMS control information on a first multicast channel (MCH);

receive at least one MBMS traffic on a second MCH based on the MBMS control information;

receive a medium access control (MAC) protocol data unit (PDU) on the second MCH, wherein the MAC PDU includes information indicating a change of the MBMS control information, wherein the information is a multicast control channel (MCCH) change indication, wherein the information is a MAC control element (CE) indicating the change of the MBMS control information, and wherein the MAC PDU further includes a MAC subheader corresponding to the MAC CE, and the MAC subheader includes a logical channel ID (LCID) for identifying the MAC CE; and receive changed MBMS control information on the first MCH if the information indicates the change of the MBMS control information.

6. The wireless apparatus of claim 5, wherein the MBMS control information is not included in the MAC PDU.

7. The wireless apparatus of claim 5, wherein, if the MAC CE is included in the MAC PDU, it indicates that there is the change of the MBMS control information.

8. The wireless apparatus of claim 5, wherein the MBMS control information includes a first value tag, and the MAC CE includes a second value tag, and wherein if the first value tag and the second value tag are different from each other, it indicates that there is the change of the MBMS control information.

9. The method of claim 1, wherein the change of the MBMS control information is indicated by using a value tag included in the MCCH change indication.

10. The wireless apparatus of claim 5, wherein the change of the MBMS control information is indicated by using a value tag included in the MCCH change indication.

* * * * *